United States Patent
Matsumoto et al.

(10) Patent No.: US 11,476,930 B2
(45) Date of Patent: Oct. 18, 2022

(54) OPTICAL TIME DOMAIN REFLECTOMETER, METHOD OF TESTING OPTICAL TRANSMISSION LINE, AND TEST SYSTEM OF OPTICAL TRANSMISSION LINE

(71) Applicant: NEC Corporation, Tokyo (JP)

(72) Inventors: Yuhei Matsumoto, Tokyo (JP); Takefumi Oguma, Tokyo (JP); Kazunori Shinya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/270,335

(22) PCT Filed: Apr. 25, 2019

(86) PCT No.: PCT/JP2019/017705
§ 371 (c)(1),
(2) Date: Feb. 22, 2021

(87) PCT Pub. No.: WO2020/044661
PCT Pub. Date: Mar. 5, 2020

(65) Prior Publication Data
US 2021/0328667 A1    Oct. 21, 2021

(30) Foreign Application Priority Data
Aug. 30, 2018   (JP) .............................. JP2018-161341

(51) Int. Cl.
H04B 10/07       (2013.01)
H04B 10/071      (2013.01)

(52) U.S. Cl.
CPC ................................ *H04B 10/071* (2013.01)

(58) Field of Classification Search
CPC .............. H04B 10/071; H04B 10/0791; H04B 10/07955; H04B 10/40
See application file for complete search history.

(56) References Cited

U.S. PATENT DOCUMENTS

| 9,363,012 B2 * | 6/2016 | Snawerdt ............. H04B 10/071 |
| 2009/0190921 A1 | 7/2009 | Nakajima et al. |

(Continued)

FOREIGN PATENT DOCUMENTS

| CN | 107483106 A | 12/2017 |
| JP | H06-167417 A | 6/1994 |

(Continued)

OTHER PUBLICATIONS

International Search Report for PCT Application No. PCT/JP2019/017705, dated Jul. 30, 2019.

(Continued)

*Primary Examiner* — Dzung D Tran

(57) ABSTRACT

An object is to automatically detect a failure of an optical transmission line. A light source outputs a monitoring light. An optical detection unit detects a return light from an optical transmission line and outputs a detection signal indicating an intensity of the return light. An optical multiplexer/demultiplexer outputs the monitoring light input from the light source to the optical transmission line, and outputs the return light input from the optical transmission line to the optical detection unit. A comparator compares the detection signal with a threshold voltage and outputs a comparison signal indicating the comparison result. A processing unit detects a first timing at which the comparison signal changes, and detects a failure of the optical transmission line when the first timing is earlier than a reference timing.

17 Claims, 9 Drawing Sheets

(56) References Cited

U.S. PATENT DOCUMENTS

| | | | |
|---|---|---|---|
| 2013/0088718 A1* | 4/2013 | Perron | H04B 10/071 356/445 |
| 2016/0187223 A1* | 6/2016 | Preston | G01B 9/0209 356/73.1 |
| 2017/0180041 A1* | 6/2017 | Yi | H04B 10/071 |
| 2019/0197846 A1* | 6/2019 | Englund | H04R 23/008 |

FOREIGN PATENT DOCUMENTS

| | | |
|---|---|---|
| JP | 2003-042901 A | 2/2003 |
| JP | 2004-156962 A | 6/2004 |
| JP | 2004-245767 A | 9/2004 |
| JP | 2008-020229 A | 1/2008 |
| JP | 2009-053163 A | 3/2009 |
| JP | 2011-007618 A | 1/2011 |
| JP | 2011-038785 A | 2/2011 |
| JP | 2011-191147 A | 9/2011 |
| JP | 2013-148561 A | 8/2013 |
| JP | 2013-156035 A | 8/2013 |
| JP | 2014-011554 A | 1/2014 |
| JP | 2014-211406 A | 11/2014 |
| WO | 2007/088976 A1 | 8/2007 |

OTHER PUBLICATIONS

Chinese Office Action for CN Application No. 201980055433.8 dated Aug. 23, 2022 with English Translation.
Japanese Office Action for JP Application No. 2020-540053 dated Aug. 30, 2022 with English Translation.

* cited by examiner

OPTICAL TIME DOMAIN REFLECTOMETER, METHOD OF TESTING OPTICAL TRANSMISSION LINE, AND TEST SYSTEM OF OPTICAL TRANSMISSION LINE

This application is a National Stage Entry of PCT/JP2019/017705 filed on Apr. 25, 2019, which claims priority from Japanese Patent Application 2018-161341 filed on Aug. 30, 2018, the contents of all of which are incorporated herein by reference, in their entirety.

TECHNICAL FIELD

The present invention relates to an optical time domain reflectometer, an optical transmission line testing method, and an optical transmission line testing system.

BACKGROUND ART

An optical time domain reflectometer referred to as an OTDR is generally used to detect breakage of an optical transmission line consisting of an optical fiber or the like. The optical time domain reflectometer outputs an optical pulse, which is a monitoring light, to the optical transmission line, and monitors a return time and intensity of a backscattered light (so-called a return light) from each part of the optical transmission line to detect a breakage position. Since the return light does not return from the breakage position and thereafter, the breakage position of the optical transmission line can be determined by detecting a timing at which the intensity of the return light decreases.

For example, it has been proposed that an OTDR waveform determination method capable of selecting not only the breakage of the optical transmission line but also an abnormal part due to a wound state of a fiber constituting the optical transmission line (PTL1).

Further, an optical time domain reflectometer for automatically setting a pulse width of an optical pulse (Monitoring light) to be output to the optical transmission line has been proposed (PTL2). In this optical time domain reflectometer, the return light from the optical transmission line is converted into an analog electric signal, and then the analog electric signal is converted into a digital signal by an A/D converter. The breakage position of the optical transmission line is detected by processing the digital signal by a data processing unit.

Furthermore, it has been proposed that an optical line monitoring apparatus capable of determining an optical transmission line in which a failure has occurred even when terminating devices and splitters are connected to an optical time domain reflectometer (Test apparatus) in multiple stages by optical transmission lines (PTL3).

CITATION LIST

Patent Literature

PTL 1: Japanese Unexamined Patent Application Publication No. 2011-38785
PTL 2: Japanese Unexamined Patent Application Publication No. H6-167417
PTL 3: International Patent Publication No. WO 2007/88976

SUMMARY OF INVENTION

Technical Problem

The general optical time domain reflectometers described above are used to determine the breakage position when the breakage of the optical transmission line occurs. In the optical time domain reflectometers described above, the intensity of the return light is generally weak, and the influence of noise superimposed on the return light is large. Thus, since it is necessary to ensure detection accuracy by receiving the return light multiple times and averaging them, it takes a long time to detect the breakage. Therefore, in the optical time domain reflectometers described above, it has been difficult to perform a responsive operation such as constantly monitoring the optical transmission line and detecting the occurrence of the breakage in real time.

For example, in PTL2, the analog signal output from the O/E conversion circuit receiving the return light is converted into the digital signal by the A/D converter. The A/D converter has a relatively large circuit scale and requires a long time for signal processing. Therefore, when the return light is detected for a predetermined period of time or the above averaging is performed, the A/D conversion process is performed a plurality of times. As a result, the time required for the breakage detection becomes long, and it is difficult to apply this technique to continuous monitoring of the optical transmission line.

The present invention has been made in view of the aforementioned circumstances and aims to automatically detect a failure in an optical transmission line.

Solution to Problem

An aspect of the present invention is an optical time domain reflectometer including: a light source configured to output a monitoring light; an optical detection unit configured to detect a return light from an optical transmission line and output a detection signal indicating an intensity of the return light; an optical multiplexer/demultiplexer configured to output the monitoring light input from the light source to the optical transmission line, and output the return light input from the optical transmission line to the optical detection unit; a first comparator configured to compare the detection signal with a first threshold voltage and output a first comparison signal indicating the comparison result; and a processing unit configured to detect a first timing at which the first comparison signal changes, and detect a failure of the optical transmission line when the first timing is earlier than a reference timing.

An aspect of the present invention is a method of testing an optical transmission line including: outputting a monitoring light to an optical transmission line; detecting a return light from the optical transmission line, and outputting a detection signal indicating an intensity of the return light; comparing the detection signal with a first threshold voltage, and outputting a first comparison signal indicating the comparison result; and detecting a first timing at which the first comparison signal changes, and detecting a failure of the optical transmission line when the first timing is earlier than the reference timing.

An aspect of the present invention is a test system of an optical transmission line including: a first optical transmission apparatus configured to transmit and receive optical signals; a second optical transmission apparatus configured to transmit and receive the optical signals; an optical transmission line connecting the first optical transmission apparatus and the second optical transmission apparatus; and an optical time domain reflectometer connected to the first optical transmission apparatus and configured to test the optical transmission line; in which the optical time domain reflectometer includes: a light source configured to output a monitoring light; an optical detection unit configured to detect a return light from the optical transmission line and output a detection signal indicating an intensity of the return light; an optical multiplexer/demultiplexer configured to output the monitoring light input from the light source to the optical transmission line, and output the return light input from the optical transmission line to the optical detection unit; a first comparator configured to compare the detection signal with a first threshold voltage and output a first comparison signal indicating the comparison result; and a processing unit configured to detect a first timing at which the first comparison signal changes, and detect a failure of the optical transmission line when the first timing is earlier than a reference timing.

Advantageous Effects of Invention

According to the present invention, it is possible to automatically detect a failure in an optical transmission line.

DESCRIPTION OF EMBODIMENTS

Figure 1:
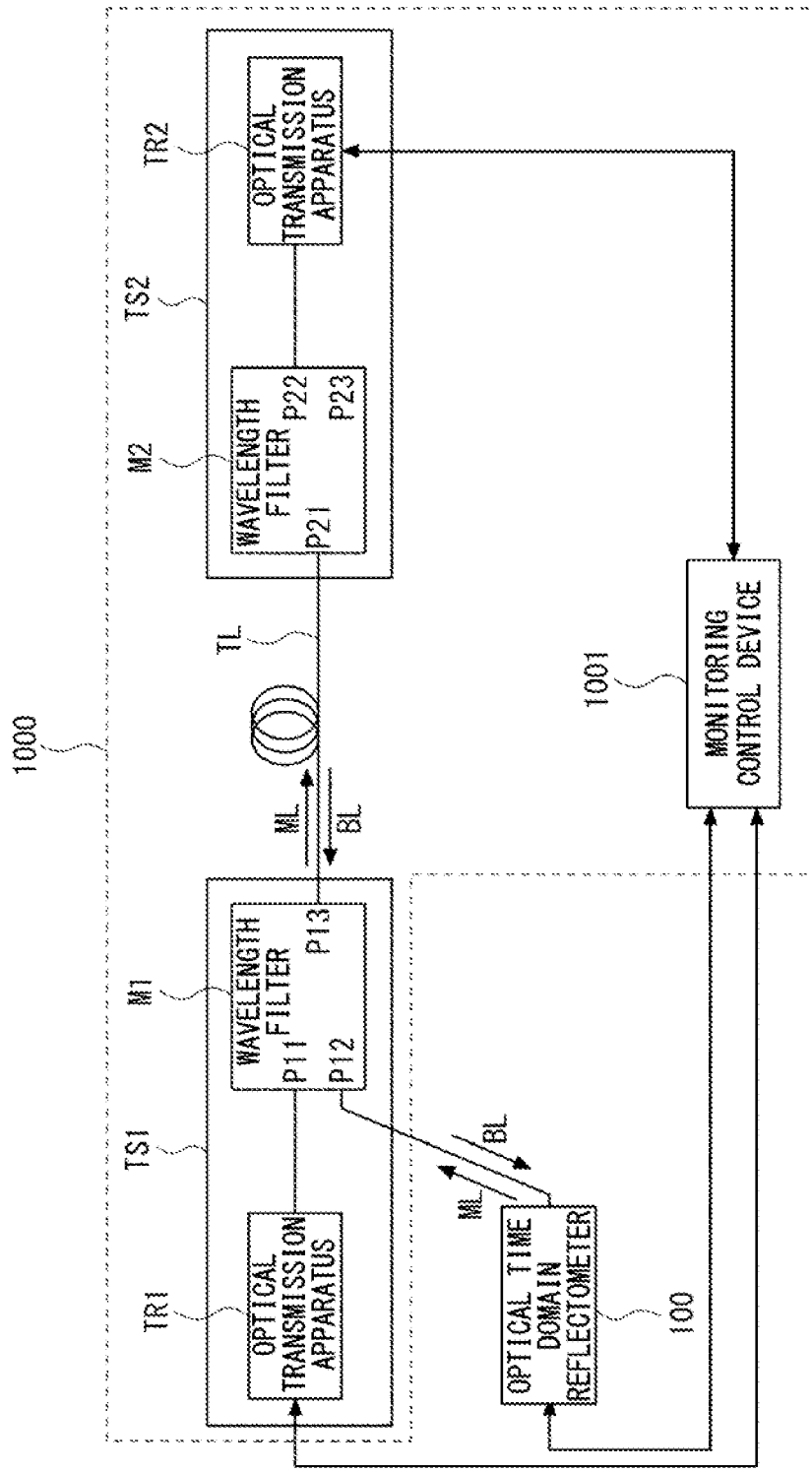
FIG. 1 is a diagram schematically showing an example of use of an optical time domain reflectometer according to a first example embodiment.

Example embodiments of the present invention will be described below with reference to the drawings. In the drawings, the same elements are denoted by the same reference numerals, and thus a repeated description is omitted as needed.

First Example Embodiment

An optical time domain reflectometer according to a first example embodiment will be described. The optical time domain reflectometer is connected to one of two terminal stations connected by an optical transmission line, for example, and is configured to output a monitoring light to the optical transmission line and detect a return light. FIG. 1 schematically shows an example of use of an optical time domain reflectometer 100 according to the first example embodiment. Here, an example of detecting breakage of an optical transmission line TL connecting a terminal station TS1 and a terminal station TS2 will be described. The terminal station TS1, the terminal station TS2, and a monitoring control apparatus 1001 constitute an optical communication network. The optical time domain reflectometer 100 is connected to the optical communication network 1000 to constitute an optical transmission line test system together with the optical communication network 1000.

The terminal station TS1 includes an optical transmission apparatus TR1 (Also referred to as a first optical transmission apparatus) that is configured to be capable of transmitting and receiving optical signals and an optical wavelength filter M1. The optical wavelength filter M1 is configured as a two-input/one-output optical wavelength filter. The optical transmission apparatus TR1 is connected to one input of the optical wavelength filter M1 (Port P11). The optical time domain reflectometer 100 is connected to the other input of the optical wavelength filter M1 (Port P12). An output of the optical wavelength filter M1 (Port P13) is connected to the optical transmission line TL.

The terminal station TS2 includes an optical transmission apparatus TR2 (Also referred to as a second optical transmission apparatus) that is configured to be capable of transmitting and receiving optical signals and an optical wavelength filter M2. The optical wavelength filter M2 is configured as a one-input/two-output optical wavelength filter. An input of the optical wavelength filter M2 (Port P21) is connected to the optical transmission line TL. The optical transmission apparatus TR2 is connected to one output of the optical wavelength filter M2 (Port P22). Although the other output of the optical wavelength filter M2 (Port P23) is open in FIG. 1, various apparatuses can be connected as appropriate.

The optical time domain reflectometer 100 outputs a monitoring light ML to the optical transmission line TL through the optical wavelength filter M1, and detects a return light BL returned from the optical transmission line TL through the optical wavelength filter M1. The optical time domain reflectometer 100 is configured to detect the breakage of the optical transmission line TL by detecting an intensity of the return light BL. The optical time domain reflectometer 100 can notify, for example, the monitoring control device 1001 of the detection result of the breakage of the optical transmission line TL. The monitoring control device 1001 may instruct one or both of the optical transmission apparatuses TR1 and TR2 to stop transmitting and receiving the optical signals when the optical transmission line has been broken.

Figure 2:
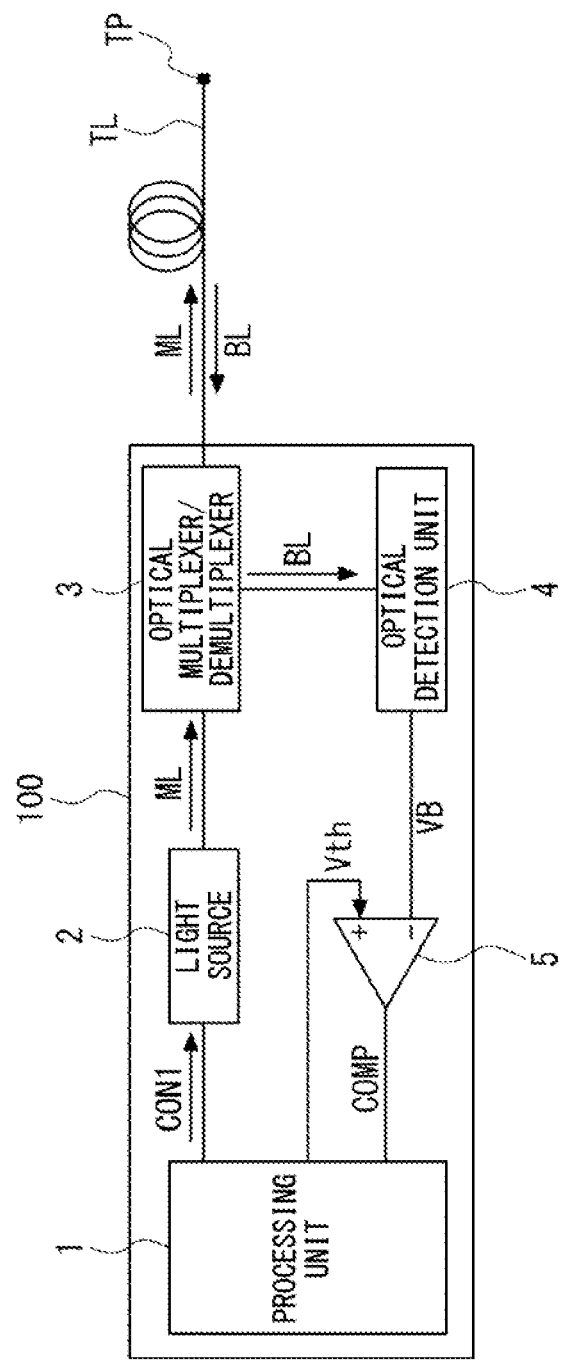
FIG. 2 is a diagram schematically showing a configuration of the optical time domain reflectometer according to the first example embodiment.
Figure 3:
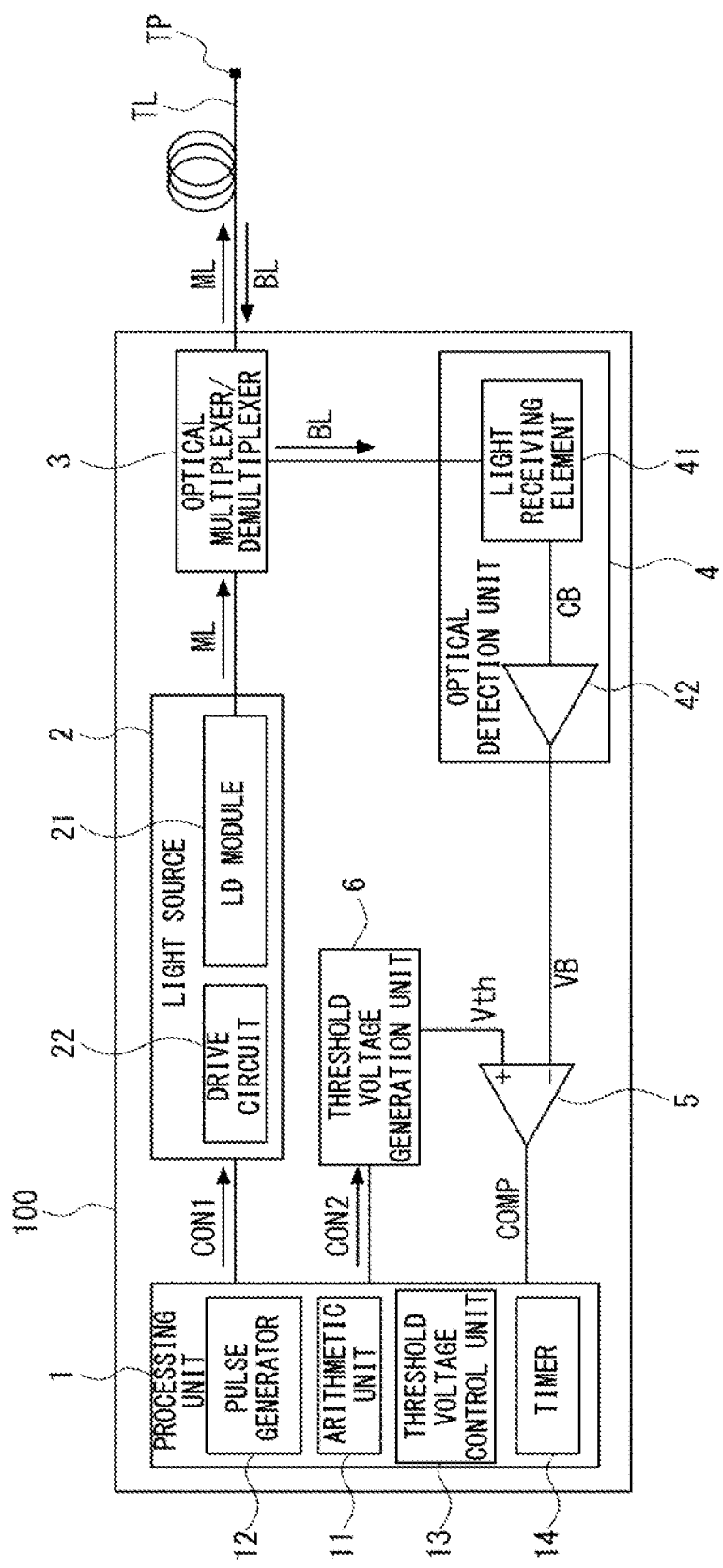
FIG. 3 is a diagram showing the configuration of the optical time domain reflectometer according to the first example embodiment in more detail.

Next, the optical time domain reflectometer 100 will be specifically described. FIG. 2 schematically shows a configuration of the optical time domain reflectometer 100 according to the first example embodiment. FIG. 3 shows the configuration of the optical time domain reflectometer 100 according to the first example embodiment in more detail. The optical time domain reflectometer 100 includes a processing unit 1, a light source 2, an optical multiplexer/demultiplexer 3, an optical detection unit 4, and a comparator 5.

The processing unit 1 is configured to be capable of controlling an operation of the light source 2 by a control signal CON1. The processing unit 1 is also configured to be capable of adjusting a threshold voltage Vth (Also referred to as a first threshold voltage) applied to one input of the comparator 5.

A configuration of the processing unit 1 will be described. The processing unit 1 includes an arithmetic unit 11, a pulse generator 12, a threshold voltage control unit 13, and a timer 14. The operation unit 11 is configured to be capable of monitoring a comparison signal COMP output from the comparator 5, and controlling operations of the pulse generator 12, the threshold voltage control unit 13, and the timer 14.

The pulse generator 12 outputs the control signal CON1 to the light source 2 to cause the light source 2 to output a pulse of the monitoring light ML. The threshold voltage control unit 13 controls a value of the threshold voltage Vth output from a threshold voltage generation unit 6 to the comparator 5 by applying a control signal CON2 to the threshold voltage generation unit 6 (Also referred to a first threshold voltage generation unit). The timer 14 is configured to be capable of measuring timing. The arithmetic unit 11 can detect a timing at which the comparison signal COMP (T=TF>0) changes based on a timing at which the monitoring light ML has been output (Timing T=0) by linking information of the timing output from the timer 14 with a value of the comparison signal COMP output from the comparator 5.

The light source 2 is configured to be capable of outputting the pulsed monitoring light ML. The light source 2 includes a laser diode (LD) module 21 and a drive circuit 22. The drive circuit 22 receives the control signal CON1 from the processing unit 1, and drives the LD module 21 in response to the control signal CON1. Thus, the LD module 21 outputs the pulsed monitoring light ML in response to the control signal CON1.

The optical multiplexer/demultiplexer 3 is configured as, for example, a directional coupler or an optical circulator, outputs the monitoring light ML input from the light source 2 to the optical transmission line TL, and outputs the return light BL input from the optical transmission line TL to the optical detection unit 4. In FIGS. 2 and 3, a terminal TP of the optical transmission line TL is illustrated. The terminal TP indicates a position of a terminal of the optical transmission line TL or a terminal at a connection destination of the optical transmission line TL. In FIG. 1, an end of the port P23, which is an open end of the optical wavelength filter M2 of the terminal station TS2, corresponds to the terminal TP.

The optical detection unit 4 converts the return light BL input from the optical multiplexer/demultiplexer 3 into an analog electric signal. Specifically, a light receiving element 41 is a photodiode, for example, and converts the return light BL into a current signal CB. In this case, an amplifier 42 is configured as a current-voltage converter (Transimpedance amplifier). The amplifier 42 amplifies the current signal CB, converts the amplified signal into a detection signal VB that is a voltage signal, and outputs the detection signal VB to the comparator 5. The amplifier 42 may be configured as various amplifiers such as a linear amplifier and a logarithmic amplifier.

The comparator 5 (Also referred to as a first comparator) compares the detection signal VB output from the optical detection unit 4 with the threshold voltage Vth, and outputs the comparison signal COMP (Also referred to as a first comparison signal), which is the result of the comparison, to the processing unit 1. As described above, the threshold voltage Vth is generated by the threshold voltage generation unit 6 and applied to the comparator 5.

In FIGS. 2 and 3, the threshold voltage Vth is input to a non-inverting input terminal of the comparator 5, and the detection signal VB is input to an inverting input terminal. In this case, when the detection signal VB is higher than the threshold voltage Vth (VB>Vth), "0" is output as the comparison signal COMP. When the detection signal VB is lower than the threshold voltage Vth (VB<Vth), "1" is output as the comparison signal COMP. Therefore, by monitoring the value of the comparison signal COMP, the arithmetic unit 11 can determine whether the intensity of the return light BL is greater than or less than a desired value. When the detection signal VB and the threshold voltage Vth are equal (VB=Vth), the comparator 5 may be configured to output either "0" or "1" as appropriate.

Figure 4:
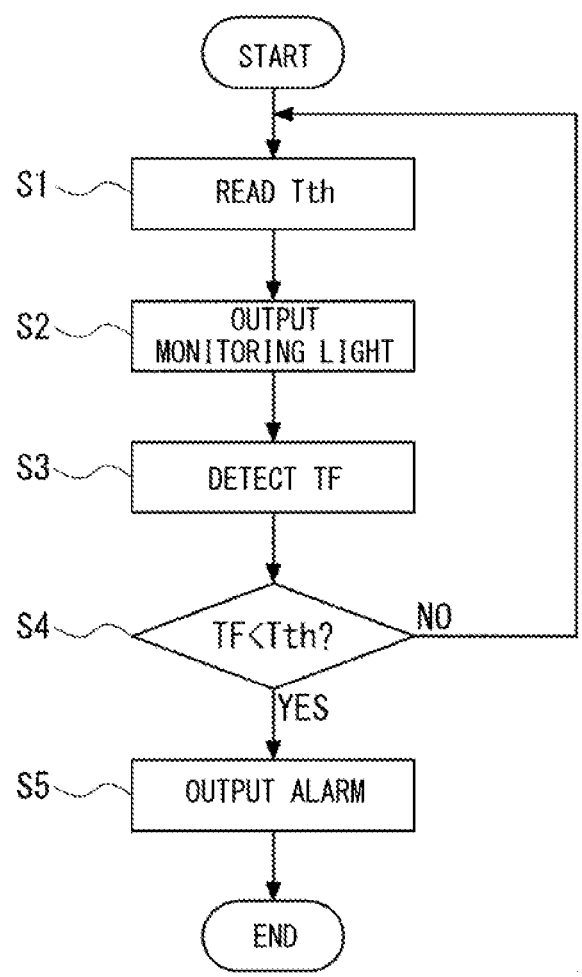
FIG. 4 is a flowchart showing a breakage detection operation of the optical time domain reflectometer according to the first example embodiment.

Next, an operation of the optical time domain reflectometer 100 will be described. FIG. 4 is a flowchart showing a breakage detection operation of the optical time domain reflectometer 100 according to the first example embodiment.

Step S1

First, the arithmetic unit 11 reads a reference timing Tth. The reference timing Tth will be described in detail later. The reference timing Tth may be provided to the arithmetic unit 11 in advance or may be provided to the arithmetic unit 11 at an arbitrary timing as appropriate. For example, information indicating the reference timing Tth may be stored in a storage device (not shown in the drawings) disposed in the processing unit 1, and the arithmetic unit 11 may read out the information indicating the reference timing Tth from the storage device as appropriate.

Step S2

The arithmetic unit 11 instructs the pulse generator 12 to output the control signal CON1 to the light source 2, and starts monitoring the comparison signal COMP. The pulse generator 12 outputs the control signal CON1 to the drive circuit 22 of the light source 2. Thus, the drive circuit 22 drives the LD module 21 in response to the control signal CON1, and the LD module 21 outputs the monitoring light ML to the optical transmission line TL.

Step S3

When the monitoring light ML is output to the optical transmission line TL, the return light BL enters the light receiving element 41 through the optical multiplexer/demultiplexer 3 due to backscattering in the optical transmission line TL. The light receiving element 41 converts the return light BL into the current signal CB and outputs the current signal CB to the amplifier 42. The amplifier 42 converts the current signal CB into the detection signal VB and amplifies the converted signal, and outputs the amplified signal to the comparator 5. The comparator 5 compares the detection signal VB output from the optical detection unit 4 with the threshold voltage Vth. The arithmetic unit 11 monitors the comparison signal COMP, and detects the timing TF (Also referred to as a first timing) at which the comparison signal COMP changes from "0" (First value) to "1" (Second value) with reference to the timing at which the monitoring light ML has been output.

Step S4

Figure 5:
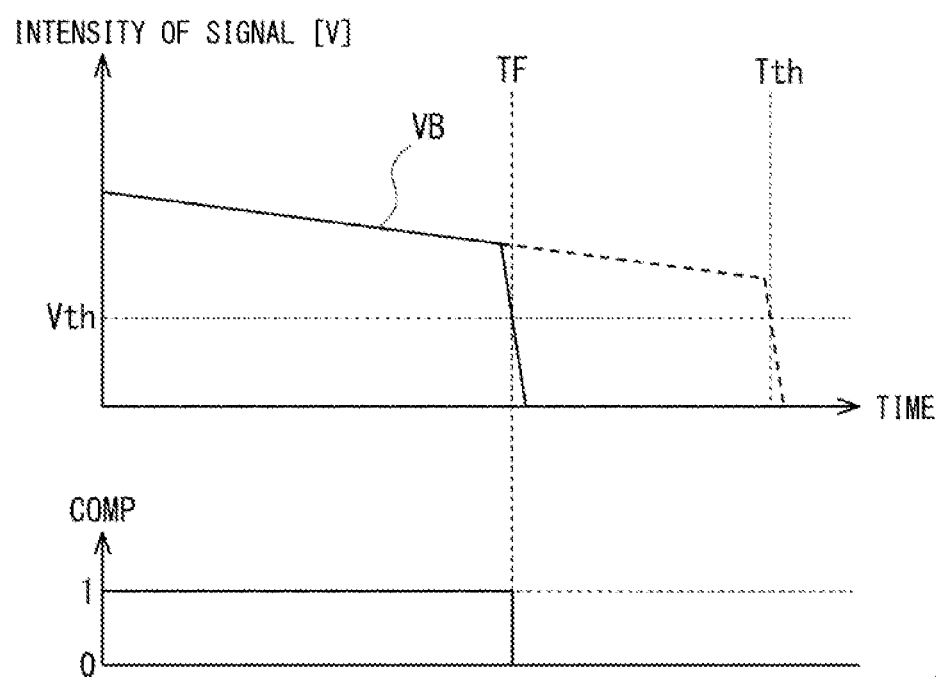
FIG. 5 is a diagram showing an intensity of a return light detected by the optical time domain reflectometer according to the first example embodiment.

The arithmetic unit 11 compares the detected timing TF with the reference timing Tth. Specifically, the arithmetic unit 11 determines whether the detected timing TF is earlier than the reference timing Tth. FIG. 5 shows the intensity of the return light BL detected by the optical time domain reflectometer 100 according to the first example embodiment. As shown in FIG. 5, the intensity of the return light BL reaches the maximum at first, and then decreases as time passes, that is, as the return light BL propagates away from the optical time domain reflectometer 100.

Here, the reference timing Tth will be described. The reference timing Tth may be a timing at which the detection signal VB becomes lower than the threshold voltage Vth (VB<Vth) at the terminal TP of the transmission line TL. That is, the reference timing Tth may be a timing T0 at which the detection signal VB of the return light BL becomes lower than the threshold voltage Vth when there is no abnormality such as the breakage of the transmission line TL.

In this case, when the optical transmission line TL is not broken, the intensity of the return light BL rapidly decreases at the reference timing Tth. On the other hand, when the optical transmission line TL is broken, as shown in FIG. 5, the intensity of the return light BL rapidly decreases at the timing TF earlier than the reference timing Tth. In this case, the optical transmission line TL is broken at a position corresponding to the timing TF. In FIG. 5, the intensity of the return light BL (Detection signal VB) when the optical transmission line TL is not broken is shown by a broken line.

When the optical transmission line TL is not broken, the detected timing TF is considered to ideally coincide with the above-described timing T0. However, in practice, since there are variations in the detection of the timing TF, the timing TF may be earlier or later than the timing T0 even when the optical transmission line TL is not broken. Therefore, a predetermined value α indicating a margin in consideration of variation may be introduced and the reference timing Tth may be a timing corresponding to a value obtained by subtracting the margin α from the timing T0 (T0−α). The predetermined value α is an arbitrary value of zero or more. When α is 0 (α=0), the reference timing Tth coincides with the timing T0. Thus, when the timing TF is earlier than the reference timing Tth that is the value obtained by subtracting the margin α from the timing T0 (T0−α), it can be concretely determined that the optical transmission line TL is broken.

As a result of the comparison, when the timing TF is later than the reference timing Tth (TF>Tth), the arithmetic unit 11 determines that the optical transmission line TL is not broken, and returns the process to the step S1 in order to constantly monitor the optical transmission line TL. When the timing TF is equal to the reference timing Tth (TF=Tth), the process may proceed to either the step S1 or S5 as appropriate.

Step S5

As a result of the comparison, when the timing TF is earlier than the reference timing Tth (TF<Tth), the arithmetic unit 11 determines that the optical transmission line TL has been broken. When it is determined that the optical transmission line TL has been broken, the arithmetic unit 11 outputs an alarm to the monitoring control device 1001 shown in FIG. 1, for example.

Thus, the monitoring control device 1001 can notify the user or the like that the alarm has been received. Therefore, according to the present configuration, it is possible to achieve an optical time domain reflectometer capable of constantly monitoring an optical transmission line and automatically detecting occurrence of breakage when the breakage has occurred in the optical transmission line.

In a general optical time domain reflectometer, a user, that is, a human, determines a breakage position by observing a waveform showing a time history of the intensity of the return light. Since the intensity of the return light is relatively weak, the monitoring light has been output a plurality of times, the intensity change of the return light had been observed a plurality of times, and the observation results have been averaged to acquire the waveform used by the user for determining the breakage position. Therefore, a long time has been required for the breakage detection in the general optical time domain reflectometer. Therefore, such a waveform acquisition method cannot be applied to an application requiring a quick response, such as a method of constantly monitoring the optical transmission line and detecting the breakage in real time.

On the other hand, in the present configuration, the comparator 5 simply compares the detection signal VB with the threshold voltage Vth, and monitors the timing at which the comparison signal COMP output from the comparator 5 changes in response to the intensity change of the return light BL, so that the breakage of the optical transmission line can be easily detected. Further, by repeating outputting of the monitoring light and monitoring the return light, it is possible to constantly monitor whether the breakage in the optical transmission line occurs.

Next, a determination of the reference timing Tth will be described. For example, when the optical time domain reflectometer 100 is connected to the optical transmission line TL for the first time or when the optical transmission line TL is replaced, a length of the optical transmission line TL is unknown, so that the timing T0 is also unknown. Therefore, the reference timing Tth has not been determined yet. Therefore, in order to perform the breakage detection according to the present embodiment, it is necessary to determine the reference timing Tth. Here, a method of automatically determining the reference timing Tth by the optical time domain reflectometer 100 will be described.

First, the optical time domain reflectometer 100 outputs the monitoring light ML to the optical transmission line TL as in the case of the step S2 shown in FIG. 4.

Next, as in the case of step S3 shown in FIG. 4, the arithmetic unit 11 monitors the comparison signal COMP and detects the timing at which the comparison signal COMP changes from "0" to "1" with reference to the timing at which the monitoring light ML has been output. In this case, assuming that the optical transmission line TL is not broken, the intensity of the return light BL rapidly decreases at the timing corresponding to the terminal TP of the optical transmission line TL. Therefore, the arithmetic unit 11 can determine the detected timing T0 as the reference timing Tth. The arithmetic unit 11 may hold the reference timing Tth, or write the information indicating the reference timing Tth in the storage device or the like described above, and read the information indicating the reference timing Tth as appropriate. Further, as described above, a timing earlier than the detected timing by the predetermined value a may be held as the reference timing Tth.

Thus, the optical time domain reflectometer 100 can constantly monitor the optical transmission line TL as shown in FIG. 4. It can be understood that when the intensity of the return light BL decreases below the threshold voltage Vth at a timing earlier than the reference timing Tth, this position can be detected as the breakage position.

As described above, when the signal is processed using the A/D converter as in the case of the general optical time domain reflectometer, the A/D conversion process takes more time than the comparison process in the comparator. On the other hand, according to the present configuration, since there is no need to use the A/D converter, it is advantageous to constantly monitor the optical transmission line.

In the optical time domain reflectometer, the intensity of the return light is generally weak because the return light is generated by backscattering in the highly transmissive optical transmission line. Therefore, an influence of noise is large, and a signal-to-noise ratio (SN ratio) of the return light becomes small. Therefore, in order to accurately detect variations in the return light with a small SN ratio, it is desirable to configure the amplifier 42 as the logarithmic amplifier. Thus, the intensity change of the return light can be advantageously detected. It should be appreciated that the amplifier 42 may be configured as an amplifier other than the logarithmic amplifier, such as a linear amplifier.

Second Example Embodiment

Figure 6:
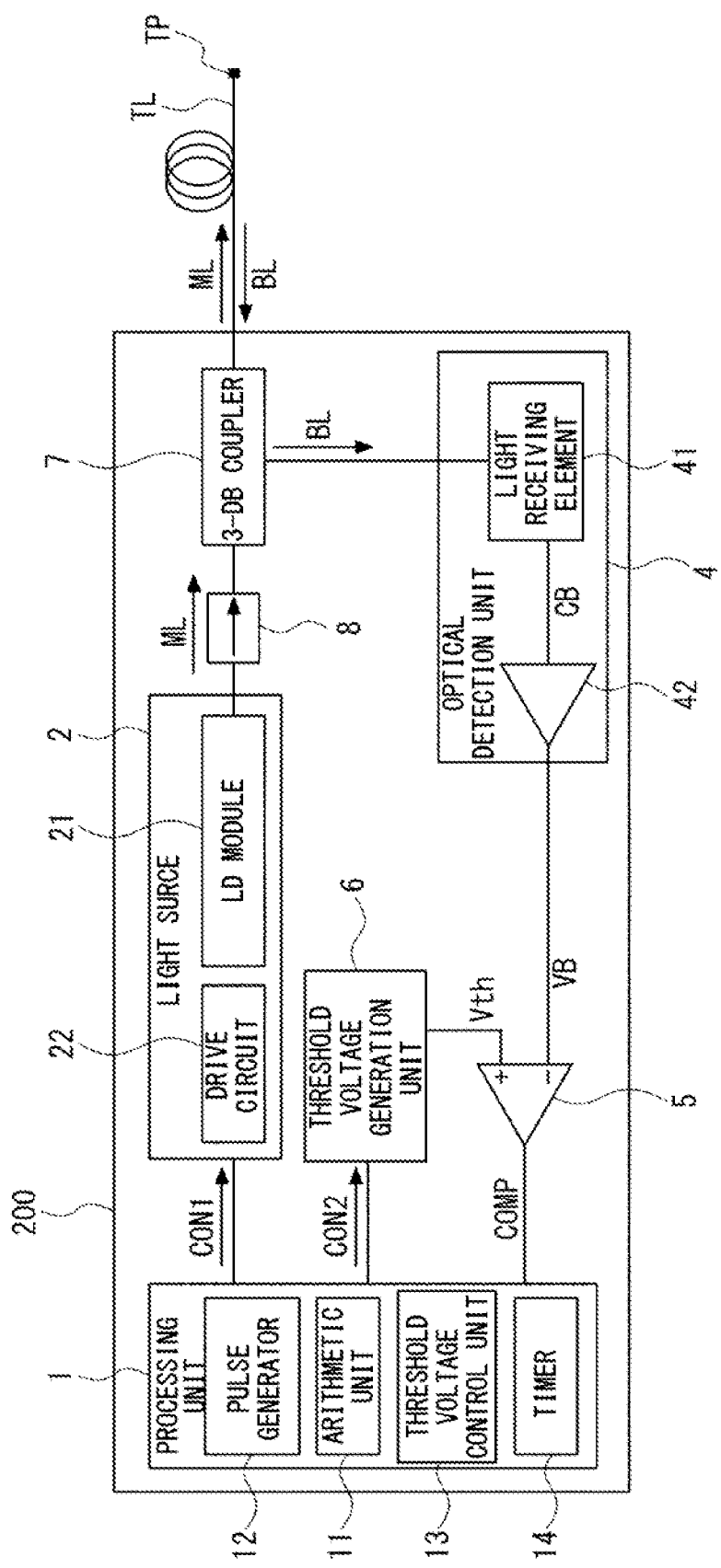
FIG. 6 is a diagram schematically showing a configuration of an optical time domain reflectometer according to a second example embodiment.

An optical transmission apparatus according to a second example embodiment will be described. FIG. 6 schematically shows a configuration of an optical time domain reflectometer 200 according to the second example embodiment. In the optical time domain reflectometer 200, a 3-dB coupler is used as the optical multiplexer/demultiplexer 3. That is, as shown in FIG. 6, the optical time domain reflectometer 200 has a configuration in which the optical multiplexer/demultiplexer 3 of the optical time domain reflectometer 100 is replaced with a 3-dB coupler 7.

It has been described that the optical time domain reflectometer 100 according to the first example embodiment has the configuration using the optical circulator or the directional coupler as the optical multiplexer/demultiplexer. In this case, since the optical circulator and the directional coupler have complex configurations and are relatively expensive components, a manufacturing cost of the optical time domain reflectometer 100 is increased.

On the other hand, in the optical time domain reflectometer 200 according to the present example embodiment, the 3-dB coupler 7 having a simple configuration is used as the optical multiplexer/demultiplexer. Thus, since a cost of the optical multiplexer/demultiplexer can be reduced, the manufacturing cost of the optical time domain reflectometer 200 can be reduced.

When using the 3-dB coupler 7, the return light BL returned from the optical transmission line TL is equally divided into two, one of which is output to the optical detection unit 4 and the other of which is output to the light source 2. Therefore, as shown in FIG. 6, it is desirable to appropriately dispose an isolator 8 between the light source 2 and the 3-dB coupler 7 to block the return light BL output from the 3-dB coupler 7. The isolator blocking the return light BL may be also disposed in the light source 2 or the LD module 21.

When using the 3-dB coupler 7, one of the two divided return lights is input to the optical detection unit 4. Therefore, the intensity of the return light input to the optical detection unit 4 is lower than that of the optical time domain reflectometer 100. Therefore, as described above, it is more desirable to configure the amplifier 42 as the logarithmic amplifier in order to detect the intensity change of the return light whose intensity is weak.

Third Example Embodiment

Figure 7:
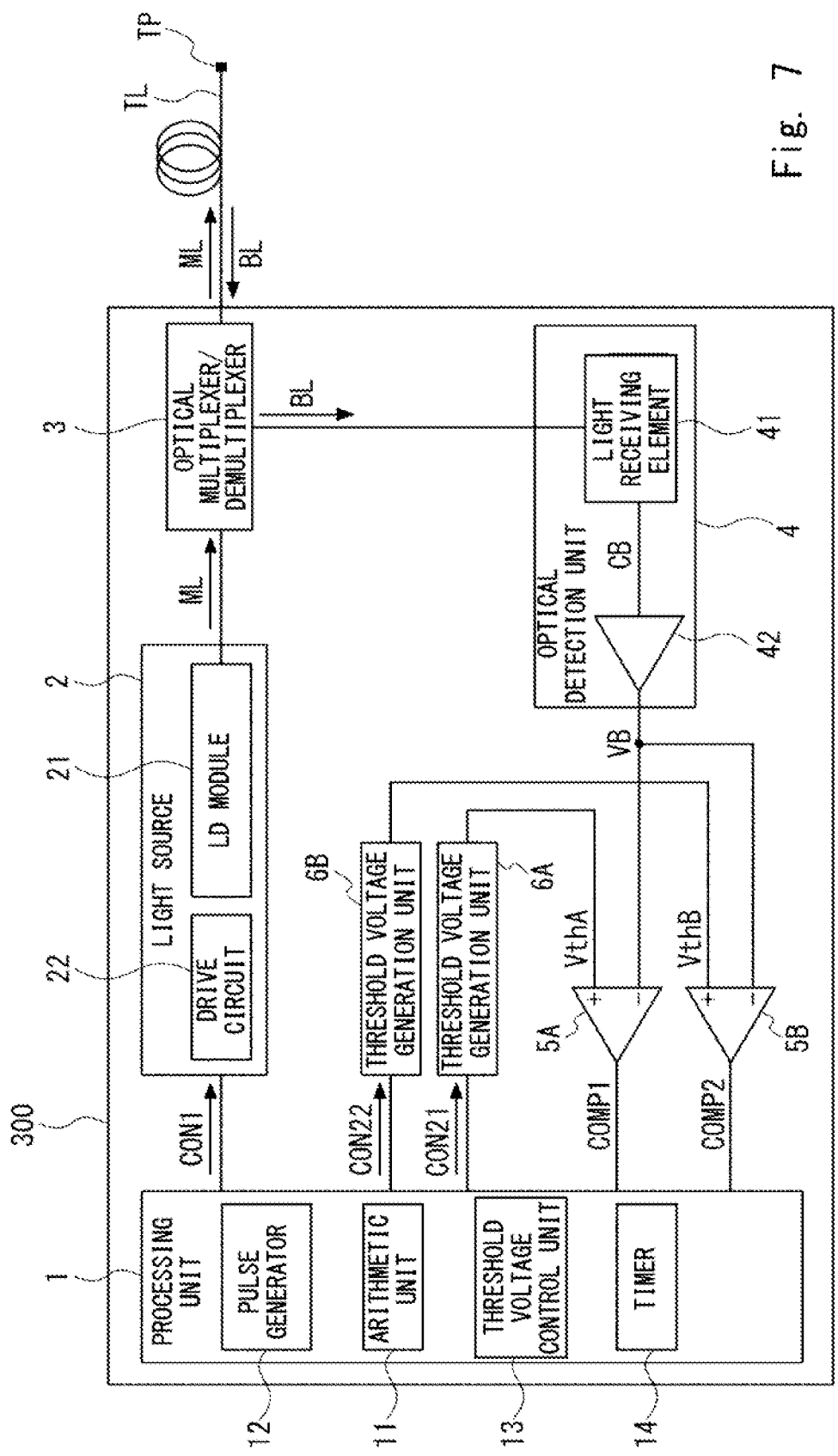
FIG. 7 is a diagram schematically showing a configuration of an optical time domain reflectometer according to a third example embodiment.

An optical transmission apparatus according to a third example embodiment will be described. In the optical time domain reflectometer 100 according to the first example embodiment, the example in which one comparator is disposed has been described. On the other hand, the optical time domain reflectometer according to the present example embodiment has a configuration in which a plurality of comparators are disposed. FIG. 7 schematically shows a configuration of an optical time domain reflectometer 300 according to the third example Embodiment.

As shown in FIG. 7, the optical time domain reflectometer 300 has two comparators. To one comparator 5A (Also referred to as the first comparator), a threshold voltage VthA (Also referred to as the first threshold voltage) is input from a threshold voltage generation unit 6A (Also referred to as first threshold voltage generation unit). The comparator 5A compares the threshold voltage VthA with the detection signal VB, and outputs a comparison signal COMP1 (Also referred to as the first comparison signal) indicating the comparison result. The other comparator 5B (Also referred to as a second comparator), the threshold voltage VthB (Also referred to as a second threshold voltage) is input from a threshold voltage generation unit 6B (Also referred to as a second threshold voltage generation unit). The comparator 5B compares the threshold voltage VthB with the detection signal VB, and outputs a comparison signal COMP2 (Also referred to as a second comparison signal) indicating the comparison result.

The threshold voltage control unit 13 can control a value of the threshold voltage VthA by outputting a control signal CON 21 to the threshold voltage generation unit 6A. The threshold voltage control unit 13 can control a value of the threshold voltage VthB by outputting a control signal CON 22 to the threshold voltage generation unit 6B.

Since the other configuration of the optical time domain reflectometer 300 is the same as that of the optical time domain reflectometer 100 according to the first example embodiment, the description thereof will be omitted.

In this configuration, by disposing two comparators, the two threshold voltages can be compared with the detection signal VB. Thus, it is possible to detect the breakage described below.

For example, when the breakage position of the optical transmission line TL is detected with high accuracy, it is conceivable that the breakage detection is performed a plurality of times and averaging is performed as described above. In this case, by disposing a plurality of comparators as the present configuration, the number of times of breakage detection can be reduced.

Further, when lights having different wavelengths are used as the monitoring lights, according to the present configuration, it is possible to set an appropriate threshold voltage for each wavelength.

Further, by appropriately setting the threshold voltage, it is possible to determine a failure mode of the optical transmission line TL. For example, a case in which deterioration has occurred in the optical transmission line TL will be discussed. In this case, although the optical transmission line TL is not broken, it is conceivable that the intensity of the return light decreases at the position where the deterioration has occurred.

Figure 8:
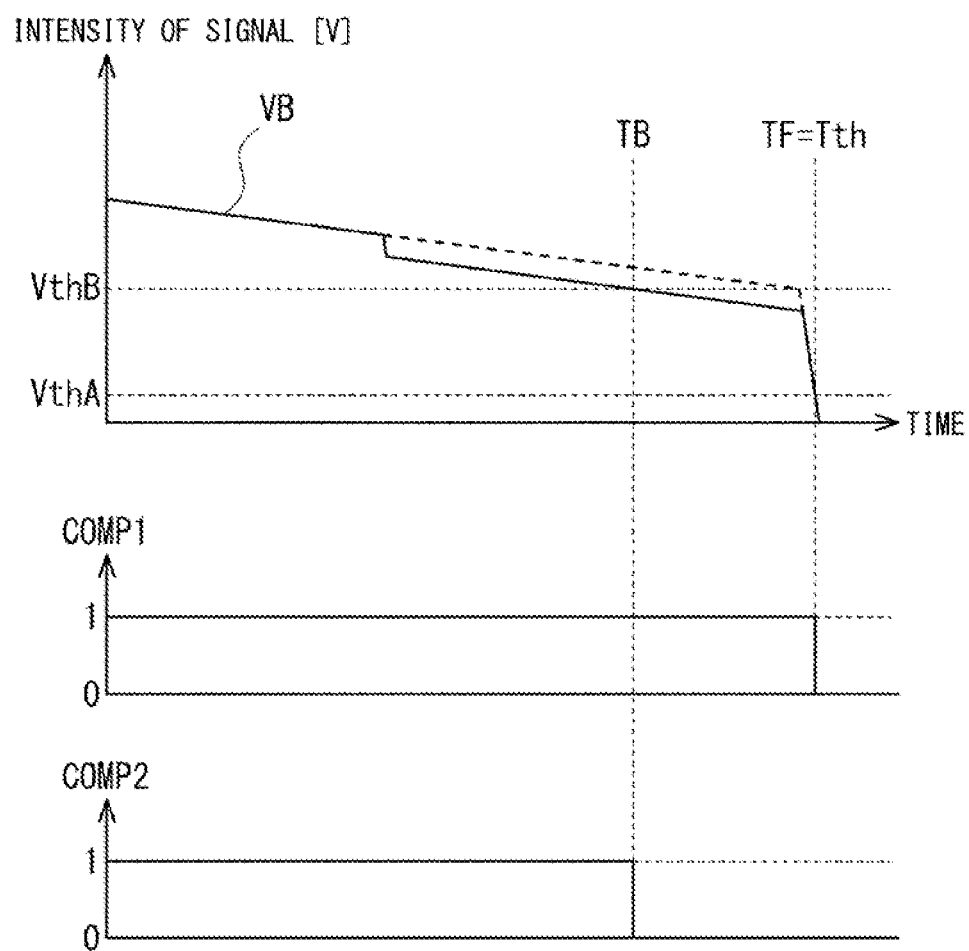
FIG. 8 is a diagram showing the intensity of the return light when the optical transmission line has been deteriorated.

FIG. 8 shows the intensity of the return light BL when the optical transmission line TL is deteriorated. As shown in FIG. 8, the intensity of the return light BL decreases at a timing before the reference timing Tth due to an influence of the deterioration of the optical transmission line TL. In this example, the threshold voltage VthB is set to detect the intensity change of the return light BL when the optical transmission line TL has been deteriorated, and the threshold voltage VthA is set to detect the intensity change of the return light BL when the optical transmission line TL has been broken. Here, the value of the detection signal VB corresponding to the intensity of the return light BL at the terminal TP of the optical transmission line TL is set as the value of the threshold voltage VthB. In FIG. 8, the detection signal VB indicating the light intensity of the return light BL decreased at a timing TB is higher than the threshold voltage VthA and lower than the threshold voltage VthB.

Therefore, at the timing TB, the comparison signal COMP2 changes from "0" to "1" and, however, the comparison signal COMP1 does not change. Here, the timing TB at which the comparison signal COMP2 changes is also referred to as a second timing. In this case, by detecting that there is the timing at which the comparison signal COMP2 changes and the comparison signal COMP1 does not change, the arithmetic unit 11 can detect that a failure other than the breakage such as deterioration has occurred in the optical transmission line TL.

In other words, according to the present configuration, by appropriately setting two threshold voltages, it is also possible to separately detect the failure modes such as breakage and the deterioration that may occur in the optical transmission line TL.

Although the configuration in which two comparators are disposed in the optical time domain reflectometer has been described above, it should be appreciated that three or more comparators may be disposed in the optical time domain reflectometer as appropriate. In this case, by disposing three or more threshold voltage generation units for respectively applying threshold voltages to the three or more comparators and respectively providing control signals to the threshold voltage generation units from the processing unit 1, appropriate threshold voltages can be provided to the comparators, respectively.

Fourth Example Embodiment

An optical transmission apparatus according to a fourth example embodiment will be described. Here, an operation of detecting a change in a length of the optical transmission line TL using the optical time domain reflectometer 100 will be described.

For example, it can be assumed that the length of the optical transmission line to be monitored by the optical time domain reflectometer changes due to maintenance work or the like. For example, when the optical transmission line is replaced and thereby becomes longer and the optical time domain reflectometer 100 performs the breakage detection operation shown in FIG. 4, the intensity of the return light BL rapidly decreases at a timing later than the reference timing Tth (i.e. TF>Tth). In this case, the optical time domain reflectometer 100 can automatically detect that the length of the optical transmission line TL has increased.

At this time, since the reference timing Tth does not correspond to the actual length of the optical transmission line TL, it is necessary to correct the reference timing Tth. In this case, the optical time domain reflectometer 100 resets the reference timing Tth and automatically determines the reference timing Tth as described in the first example embodiment, so that the reference timing Tth corresponding to the actual length of the optical transmission line TL can be determined.

As described above, according to the present configuration, when the length of the optical transmission line TL changes, the reference timing Tth can be automatically reset.

Fifth Example Embodiment

An optical transmission apparatus according to a fifth example embodiment will be described. Here, an operation of the optical time domain reflectometer 100 for detecting an instantaneous interruption of the optical signal in the optical transmission line TL will be described. In the optical transmission line TL, the instantaneous interruption of the optical signal may occur due to, for example, an influence of a lightning strike. In the present example embodiment, the instantaneous interruption of the optical signal is detected by monitoring the intensity of the return light BL.

The intensity of the return light BL is continuously greatly reduced when the optical transmission line TL has been broken, while the intensity of the return light BL has been temporarily reduced when the instantaneous interruption of the optical signal has occurred. Therefore, it is considered that the instantaneous interruption of the optical signal can be detected by detecting a temporary decrease in the intensity of the return light BL.

As described in the above example embodiments, since the optical time domain reflectometer 100 constantly detects the optical transmission line TL, it continuously detects the timing TF. When the optical transmission line TL has been broken, the timing TF becomes earlier than the reference timing Tth (T0−α) (TF<Tth=T0−α) after the breakage occurs. Thereafter, even when the monitoring of the optical transmission line TL is continued, the timing TF remains at the timing earlier than the reference timing Tth (T0−α) (TF<Tth=T0−α).

Figure 9:
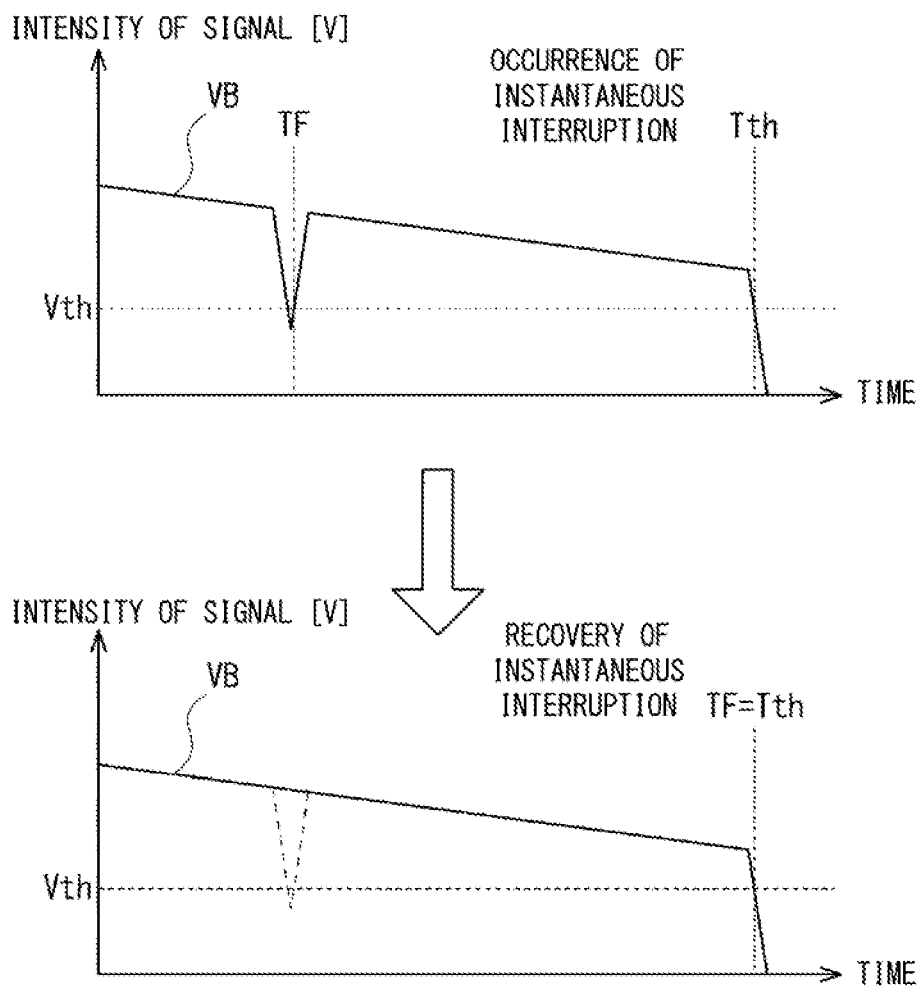
FIG. 9 is a diagram showing the intensity of the return light when an instantaneous interruption of the optical signal has occurred and the intensity of the return light when the instantaneous interruption of the optical signal has been recovered.

On the other hand, when the instantaneous interruption of the optical signal has occurred in the optical transmission line TL, the timing TF shows a variation other than that in the case of the breakage of the optical transmission line TL. FIG. 9 shows the intensity of the return light BL when the instantaneous interruption of the optical signal has occurred and the intensity of the return light BL when the instantaneous interruption of the optical signal is recovered. When the instantaneous interruption of the optical signal has occurred in the optical transmission line TL, the timing TF at the point of time when the instantaneous interruption occurs becomes a timing earlier than the reference timing Tth (T0−α) (TF<Tth=T0−α). Thereafter, when the instantaneous interruption is recovered, the return light BL reaches the terminal TP of the optical transmission line TL without being weakened in the middle, so that the value of the timing TF increases, and the timing becomes the same as or later than the reference timing Tth (TF≥Tth=T0−α).

Therefore, when the timing TF once becomes earlier than the reference timing Tth (TF<Tth=T0−α) and then the value of the timing TF increases to become the same as the reference timing Tth or the timing later than the reference timing Tth (TF≥Tth=T0−α), the optical time domain reflectometer 100 can detect that the instantaneous interruption of the optical signal instead of the breakage has occurred in the optical transmission line TL.

When the occurrence and recovery of the instantaneous interruption of the optical signal has been detected, the optical time domain reflectometer 100 may notify, for example, the monitoring control device 1001 of the occurrence of the instantaneous interruption of the optical signal. Further, the optical time domain reflectometer 100 may also notify that the instantaneous interruption of the optical signal has been already recovered.

The threshold voltage Vth to detect the breakage is used in the present example embodiment. However, when the slight instantaneous interruption of the optical signal with a smaller decrease in the intensity of the return light has occurred, it is conceivable that the detection signal VB when the instantaneous interruption has occurred is not lower than the threshold voltage Vth. Therefore, a threshold voltage VthC (Also referred to as the second threshold voltage) higher than the threshold voltage Vth may be set, and the detection signal VB may be compared with the threshold voltage VthC to detect the slight instantaneous interruption of the optical signal. In order to distinguish between the instantaneous interruption of the optical signal and the breakage, for example, the value of the detection signal VB corresponding to the intensity of the return light BL at the terminal TP of the optical transmission line TL may be set as the value of the threshold voltage VthC.

According to the present configuration, the occurrence of the instantaneous interruption of the optical signal can be detected while distinguishing it from the breakage or deterioration of the optical transmission line TL. Thus, the user or the like who is notified of the occurrence of the instantaneous interruption can recognize that it is a temporary phenomenon that does not require maintenance work unlike the breakage or deterioration of the optical transmission line TL.

When the instantaneous interruption of the optical signal frequently occurs in the same optical transmission line, it is possible to take measures for preventing the occurrence of the instantaneous interruption other than measures for preventing the failure such as the breakage or deterioration.

Other Example Embodiments

The present invention is not limited to the above-described example embodiments, and can be modified as appropriate without departing from the scope of the invention. For example, the configuration of the processing unit, the light source, and the light detection unit according to the above-described example embodiment is merely exemplary, and other configurations may be used as appropriate.

While the present invention has been described above with reference to example embodiments, the present invention is not limited to the example embodiments described above.

(Supplementary Note 1) An optical time domain reflectometer including: a light source configured to output a monitoring light; an optical detection unit configured to detect a return light from an optical transmission line and output a detection signal indicating an intensity of the return light; an optical multiplexer/demultiplexer configured to output the monitoring light input from the light source to the optical transmission line, and output the return light input from the optical transmission line to the optical detection unit; a first comparator configured to compare the detection signal with a first threshold voltage and output a first comparison signal indicating the comparison result; and a processing unit configured to detect a first timing at which the first comparison signal changes, and detect a failure of the optical transmission line when the first timing is earlier than a reference timing.

(Supplementary Note 2) The optical time domain reflectometer according to Supplementary Note 1, in which the reference timing is a timing at which the first comparison signal changes in a state in which the optical transmission line is not broken.

(Supplementary Note 3) The optical time domain reflectometer according to Supplementary Note 1, in which the reference timing is a timing earlier than the timing at which the first comparison signal changes in the state in which the optical transmission line is not broken by a predetermined value of 0 or more.

(Supplementary Note 4) The optical time domain reflectometer according to any one of Supplementary Notes 1 to 3, in which the processing unit detects that the optical transmission line has been broken when the first timing is earlier than the reference timing.

(Supplementary Note 5) The optical time domain reflectometer according to any one of Supplementary Notes 1 to 4, further including a first threshold voltage generation unit configured to apply the first threshold voltage to the first comparator, in which the processing unit controls a value of the first threshold voltage by controlling the first threshold voltage generation unit.

(Supplementary Note 6) The optical time domain reflectometer according to any one of Supplementary Notes 1 to 5, in which the light detection unit includes: a light receiving element configured to receive the return light and convert the return light into an electric signal; and an amplifier configured to amplify the electric signal.

(Supplementary Note 7) The optical time domain reflectometer according to Supplementary Note 6, in which the amplifier is a logarithmic amplifier (Supplementary Note 8) The optical time domain reflectometer according to Supplementary Note 6 or 7, in which the electric signal is a current signal, and the amplifier is configured as a current-voltage converter.

(Supplementary Note 9) The optical time domain reflectometer according to any one of Supplementary Notes 1 to 8, in which the optical multiplexer/demultiplexer is configured as a 3-dB coupler.

(Supplementary Note 10) The optical time domain reflectometer according to any one of Supplementary Notes 1 to 9, further including a second comparator configured to compare the detection signal with a second threshold voltage and output a second comparison signal indicating the comparison result, in which the processing unit detects a second timing at which the second comparison signal changes, and detects the failure of the optical transmission line when the second timing is earlier than the reference timing.

(Supplementary Note 11) The optical time domain reflectometer according to Supplementary Note 10, in which the second threshold voltage is higher than the first threshold voltage, and when the second comparison signal changes and the first comparison signal does not change at the second timing, the processing unit detects that the failure other than the failure detected when the first comparison signal changes has occurred in the optical transmission line.

(Supplementary Note 12) The optical time domain reflectometer according to Supplementary Note 11, in which the processing unit detects that the optical transmission line has been deteriorated when the second comparison signal changes and the first comparison signal does not change at the second timing.

(Supplementary Note 13) The optical time domain reflectometer according to Supplementary Note 11, in which, when the first comparison signal does not change and the second comparison signal changes from a first value to a second value at the second timing, and then the second comparison signal changes from the second value to the first value, the processing unit detects that an instantaneous interruption of an optical signal transmitted through the optical transmission line has occurred.

(Supplementary Note 14) The optical time domain reflectometer according to Supplementary Note 12 or 13, in which the second threshold voltage is a voltage corresponding to the intensity of the return light at an end of the optical transmission line.

(Supplementary Note 15) The optical time domain reflectometer according to any one of Supplementary Notes 10 to 14, further including a second threshold voltage generation unit configured to apply the second threshold voltage to the second comparator, in which the processing unit controls a value of the second threshold voltage by controlling the second threshold voltage generation unit.

(Supplementary Note 16) The optical time domain reflectometer according to any one of Supplementary Notes 1 to 9, in which, when the first comparison signal changes from the first value to the second value and then the first comparison signal changes from the second value to the first value, the processing unit detects that an instantaneous interruption of an optical signal transmitted through the optical transmission line has occurred.

(Supplementary Note 17) The optical time domain reflectometer according to any one of Supplementary Notes 1 to 15, in which, when the first timing is later than the reference timing, the processing unit sets the first timing as the reference timing.

(Supplementary Note 18) A method of testing an optical transmission line including: outputting a monitoring light to an optical transmission line; detecting a return light from the optical transmission line, and outputting a detection signal indicating an intensity of the return light; comparing the detection signal with a first threshold voltage, and outputting a first comparison signal indicating the comparison result; and detecting a first timing at which the first comparison signal changes, and detecting a failure of the optical transmission line when the first timing is earlier than the reference timing.

(Supplementary Note 19) A test system of an optical transmission line including: a first optical transmission apparatus configured to transmit and receive optical signals; a second optical transmission apparatus configured to transmit and receive the optical signals; an optical transmission line connecting the first optical transmission apparatus and the second optical transmission apparatus; and an optical time domain reflectometer connected to the first optical transmission apparatus and configured to test the optical transmission line; in which the optical time domain reflectometer includes: a light source configured to output a monitoring light; an optical detection unit configured to detect a return light from the optical transmission line and output a detection signal indicating an intensity of the return light; an optical multiplexer/demultiplexer configured to output the monitoring light input from the light source to the optical transmission line, and output the return light input from the optical transmission line to the optical detection unit; a first comparator configured to compare the detection signal with a first threshold voltage and output a first comparison signal indicating the comparison result; and a processing unit configured to detect a first timing at which the first comparison signal changes, and detect a failure of the optical transmission line when the first timing is earlier than a reference timing.

Although the present invention has been described above with reference to the embodiments, the present invention is not limited by the foregoing. Various changes in the structure and details of the present invention can be understood by a person skilled in the art within the scope of the invention.

This application claims priority on the basis of Japanese Patent Application No. 2018-161341, filed Aug. 30, 2018, the entire disclosure of which is incorporated herein by reference.

REFERENCE SIGNS LIST

1 PROCESSING UNIT
2 LIGHT SOURCE
3 OPTICAL MULTIPLEXER/DEMULTIPLEXER
4 OPTICAL DETECTION UNIT
5, 5A, 5B COMPARATORS
6, 6A, 6B THRESHOLD VOLTAGE GENERATION UNITS
7 COUPLER
8 ISOLATOR
11 ARITHMETIC UNIT
12 PULSE GENERATOR
13 THRESHOLD VOLTAGE CONTROL UNIT
14 TIMERS
21 LD MODULE
22 DRIVE CIRCUIT
41 LIGHT RECEIVING ELEMENT
42 AMPLIFIER
100, 200, 300 OPTICAL TIME DOMAIN REFLECTOMETERS
1000 OPTICAL COMMUNICATION NETWORK
1001 MONITORING CONTROL DEVICE
BL RETURN LIGHT
CB CURRENT SIGNAL
COMP, COMP1, COMP2 COMPARISON SIGNALS
CON1, CON2, CON 21, CON 22 CONTROL SIGNALS
M1, M2 WAVELENGTH FILTERS
ML MONITOR LIGHT
P 11 TO P 13, P 21 TO P 23 PORTS
TL OPTICAL TRANSMISSION LINE
TP TERMINAL
TR1, TR2 OPTICAL TRANSMISSION APPARATUS
TS1, TS2 TERMINAL STATIONS
VB DETECTION SIGNAL

What is claimed is:

1. An optical time domain reflectometer comprising:
a light source configured to output a monitoring light; an optical detection unit configured to detect a return light from an optical transmission line and output a detection signal indicating an intensity of the return light;
an optical multiplexer/demultiplexer configured to output the monitoring light input from the light source to the optical transmission line, and output the return light input from the optical transmission line to the optical detection unit; a first comparator configured to compare the detection signal with a first threshold voltage and output a first comparison signal indicating the comparison result;
a processing unit configured to detect a first timing at which the first comparison signal changes, and detect a failure of the optical transmission line when the first timing is earlier than a reference timing; and
a second comparator configured to compare the detection signal with a second threshold voltage and output a second comparison signal indicating the comparison result, wherein
the processing unit detects a second timing at which the second comparison signal changes, and detects the failure of the optical transmission line when the second timing is earlier than the reference timing,
the second threshold voltage is higher than the first threshold voltage,
when the second comparison signal changes and the first comparison signal does not change at the second timing, the processing unit detects that the failure other than the failure detected when the first comparison signal changes has occurred in the optical transmission line, and
when the first comparison signal does not change and the second comparison signal changes from a first value to a second value at the second timing, and then the second comparison signal changes from the second value to the first value, the processing unit detects that an instantaneous interruption of an optical signal transmitted through the optical transmission line has occurred.

2. The optical time domain reflectometer according to claim 1, wherein the reference timing is a timing at which the first comparison signal changes in a state in which the optical transmission line is not broken.

3. The optical time domain reflectometer according to claim 1, wherein the reference timing is a timing earlier than the timing at which the first comparison signal changes in the state in which the optical transmission line is not broken by a predetermined value of 0 or more.

4. The optical time domain reflectometer according to claim 1, wherein the processing unit detects that the optical transmission line has been broken when the first timing is earlier than the reference timing.

5. The optical time domain reflectometer according to claim 1, further comprising a first threshold voltage generation unit configured to apply the first threshold voltage to the first comparator, wherein the processing unit controls a value of the first threshold voltage by controlling the first threshold voltage generation unit.

6. The optical time domain reflectometer according to claim 1, wherein the light detection unit comprises:
 a light receiving element configured to receive the return light and convert the return light into an electric signal; and
 an amplifier configured to amplify the electric signal.

7. The optical time domain reflectometer according to claim 6, wherein the amplifier is a logarithmic amplifier.

8. The optical time domain reflectometer according to claim 6, wherein the electric signal is a current signal, and the amplifier is configured as a current-voltage converter.

9. The optical time domain reflectometer according to claim 1, wherein the optical multiplexer/demultiplexer is configured as a 3-dB coupler.

10. The optical time domain reflectometer according to claim 1, wherein the second threshold voltage is a voltage corresponding to the intensity of the return light at an end of the optical transmission line.

11. The optical time domain reflectometer according to claim 1, further comprising a second threshold voltage generation unit configured to apply the second threshold voltage to the second comparator, wherein
 the processing unit controls a value of the second threshold voltage by controlling the second threshold voltage generation unit.

12. The optical time domain reflectometer according to claim 1, wherein, when the first timing is later than the reference timing, the processing unit sets the first timing as the reference timing.

13. An optical time domain reflectometer comprising:
 a light source configured to output a monitoring light;
 an optical detection unit configured to detect a return light from an optical transmission line and output a detection signal indicating an intensity of the return light;
 an optical multiplexer/demultiplexer configured to output the monitoring light input from the light source to the optical transmission line, and output the return light input from the optical transmission line to the optical detection unit;
 a first comparator configured to compare the detection signal with a first threshold voltage and output a first comparison signal indicating the comparison result; and
 a processing unit configured to detect a first timing at which the first comparison signal changes, and detect a failure of the optical transmission line when the first timing is earlier than a reference timing, wherein,
 when the first comparison signal changes from the first value to the second value and then the first comparison signal changes from the second value to the first value, the processing unit detects that an instantaneous interruption of an optical signal transmitted through the optical transmission line has occurred.

14. A method of testing an optical transmission line comprising:
 outputting a monitoring light to an optical transmission line;
 detecting a return light from the optical transmission line, and outputting a detection signal indicating an intensity of the return light;
 comparing the detection signal with a first threshold voltage, and outputting a first comparison signal indicating the comparison result;
 detecting a first timing at which the first comparison signal changes, and detecting a failure of the optical transmission line when the first timing is earlier than the reference timing; and
 comparing the detection signal with a second threshold voltage and output a second comparison signal indicating the comparison result, wherein
 a second timing at which the second comparison signal changes is detected, and the failure of the optical transmission line is detected when the second timing is earlier than the reference timing,
 the second threshold voltage is higher than the first threshold voltage,
 when the second comparison signal changes and the first comparison signal does not change at the second timing, that the failure other than the failure detected when the first comparison signal changes has occurred in the optical transmission line is detected, and
  when the first comparison signal does not change and the second comparison signal changes from a first value to a second value at the second timing, and then the second comparison signal changes from the second value to the first value, that an instantaneous interruption of an optical signal transmitted through the optical transmission line has occurred is detected.

15. A test system of an optical transmission line comprising:
 a first optical transmission apparatus configured to transmit and receive optical signals;
 a second optical transmission apparatus configured to transmit and receive the optical signals;
 an optical transmission line connecting the first optical transmission apparatus and the second optical transmission apparatus; and
 an optical time domain reflectometer connected to the first optical transmission apparatus and configured to test the optical transmission line; wherein
 the optical time domain reflectometer comprises:
  a light source configured to output a monitoring light;
  an optical detection unit configured to detect a return light from the optical transmission line and output a detection signal indicating an intensity of the return light;

an optical multiplexer/demultiplexer configured to output the monitoring light input from the light source to the optical transmission line, and output the return light input from the optical transmission line to the optical detection unit;

a first comparator configured to compare the detection signal with a first threshold voltage and output a first comparison signal indicating the comparison result;

a processing unit configured to detect a first timing at which the first comparison signal changes, and detect a failure of the optical transmission line when the first timing is earlier than a reference timing; and a second comparator configured to compare the detection signal with a second threshold voltage and output a second comparison signal indicating the comparison result, wherein the processing unit detects a second timing at which the second comparison signal changes, and detects the failure of the optical transmission line when the second timing is earlier than the reference timing, the second threshold voltage is higher than the first threshold voltage, when the second comparison signal changes and the first comparison signal does not change at the second timing, the processing unit detects that the failure other than the failure detected when the first comparison signal changes has occurred in the optical transmission line, and when the first comparison signal does not change and the second comparison signal changes from a first value to a second value at the second timing, and then the second comparison signal changes from the second value to the first value, the processing unit detects that an instantaneous interruption of an optical signal transmitted through the optical transmission line has occurred.

16. A method of testing an optical transmission line comprising:

outputting a monitoring light to an optical transmission line;

detecting a return light from the optical transmission line, and outputting a detection signal indicating an intensity of the return light;

comparing the detection signal with a first threshold voltage, and outputting a first comparison signal indicating the comparison result;

detecting a first timing at which the first comparison signal changes, and detecting a failure of the optical transmission line when the first timing is earlier than the reference timing, wherein, when the first comparison signal changes from the first value to the second value and then the first comparison signal changes from the second value to the first value, that an instantaneous interruption of an optical signal transmitted through the optical transmission line has occurred is detected.

17. A test system of an optical transmission line comprising:

a first optical transmission apparatus configured to transmit and receive optical signals;

a second optical transmission apparatus configured to transmit and receive the optical signals;

an optical transmission line connecting the first optical transmission apparatus and the second optical transmission apparatus; and an optical time domain reflectometer connected to the first optical transmission apparatus and configured to test the optical transmission line; wherein the optical time domain reflectometer comprises:

a light source configured to output a monitoring light;

an optical detection unit configured to detect a return light from the optical transmission line and output a detection signal indicating an intensity of the return light;

an optical multiplexer/demultiplexer configured to output the monitoring light input from the light source to the optical transmission line, and output the return light input from the optical transmission line to the optical detection unit;

a first comparator configured to compare the detection signal with a first threshold voltage and output a first comparison signal indicating the comparison result; and a processing unit configured to detect a first timing at which the first comparison signal changes, and detect a failure of the optical transmission line when the first timing is earlier than a reference timing, wherein, when the first comparison signal changes from the first value to the second value and then the first comparison signal changes from the second value to the first value, the processing unit detects that an instantaneous interruption of an optical signal transmitted through the optical transmission line has occurred.

* * * * *